Patented Mar. 4, 1930

1,749,713

UNITED STATES PATENT OFFICE

GILBERT MICHEL, OF BAGNEUX, FRANCE, ASSIGNOR TO HART O. BERG, OF PARIS, FRANCE

PROCESS FOR THE PROTECTION OF READILY-OXIDIZABLE METALS

No Drawing. Application filed August 13, 1925, Serial No. 50,140, and in France March 20, 1925.

My invention has for its object a process for protecting magnesium and articles formed thereof, and its alloys which consist largely of magnesium, as well as calcium and other easily oxidized metals, against oxidation, atmospheric effects and the like.

It was admitted up to the present time that many metals would withstand attack by phenol and organic substances of the same category. In particular it was observed that phenol is without reaction upon aluminum. Phenol has heretofore been employed as a consequence, in paints for the protection of hulls of ships against incrusting living organisms. Such paints presented the double aspect of not attacking metallic substances and of possessing antiseptic properties.

The applicant has now made the surprising discovery that in contrast to the action upon other metals, phenol produces a reaction when applied to magnesium. It was observed that if the surfaces of magnesium articles are properly cleaned, the action of phenol produces the formation of a layer or crust which possesses the double property of excessive adherence and of being impermeable.

The present invention consists therefore in protecting magnesium objects by first effecting a careful cleaning of the surface and by then causing a substance containing free phenol to react upon the said surface.

By the term phenol is to be here understood the organic substances which contain OH combined with an aryl hydrocarbon radical, and especially carbolic acid of commerce and cresol.

The said process consists essentially in coating the metal piece with a layer of phenol, for instance ordinary commercial phenol. While pure phenol is a crystalline solid, it is well known that the commercial phenol is a thickish liquid, containing some water, and usually further impurities. It will consequently be found that there will be formed on the surface of the metal as a result of the reaction between the said metal and said phenol, a solid crust or film which adheres strongly to the metal and effectively protects it against all subsequent action.

Without restricting myself to any particular theory, it is my belief that the said crust is composed of phenate of magnesium.

Known methods are in use for protecting magnesium objects by coating them with hydrocarbons, but this will not afford an adherent crust or layer, and the protection is by no means efficacious, since the hydrocarbon layer can be removed by simple friction.

The organic bodies in which the phenol group is present, and chiefly the ordinary commercial phenol, will on the contrary produce a solid layer, crust or film which adheres to the metal object and is united in one with the same.

I may obtain the layer of the phenolic substance in any suitable manner, for instance by dipping, brushing, spraying or by like means. In most cases, it will be sufficient to apply a layer of phenol with the brush. To provide for the proper adhesion of the resulting crust, I prefer to preliminarily clean or to pickle the surface to be protected, in an adequate manner.

The resulting crust is not of a very attractive appearance, but it may suffice in numerous cases. It may however be useful to cover the said crust with paint, varnish or like coating substance, this being suitably colored if desired. In this event the phenol crust serves as a backing for the coat of paint or the like which would only adhere imperfectly were it applied to the metal itself, but the paint will adhere in a practically inseparable manner to the said phenol crust which is itself united to the metal. In this manner I obtain coatings or layers of all kinds upon the metal which are of a most substantial and durable nature.

It is not essential according to the invention that pure phenol be used to obtain the protecting coatings or crusts as above set forth; all substances or compounds containing a phenol can also be used.

My said invention further covers the combined method of protecting and decorating of pieces in oxidizable metals or alloys, which consists in combining the phenol substances and the paint in a single coating product or in other words, in coating the metal with a paint containing a phenol.

I claim:

1. Process for the protection of objects made of readily oxidizable light metal containing magnesium, which comprises applying upon the surface thereof, a substance containing a phenol as a major component, which phenol is capable of readily reacting with magnesium to form a closely adherent protective layer on the surface of said article.

2. Process for the protection of objects in readily oxidizable metal containing magnesium as a predominating constituent, which comprises forming an adherent protecting crust on the surface of the metal by the application of a substance containing a phenol, whereby a reaction product of the phenol and the magnesium surface is formed, to which paint will firmly adhere.

3. As a new article of manufacture, an object of metal having magnesium as a base, having a protecting surface crust containing a product from the reaction of a phenolic body with the magnesium surface.

4. A magnesium article coated with a composition containing a phenolic substance, thereby forming a protective, closely adherent crust on its surface, containing a product from the reaction of a phenolic body with the magnesium surface, to which paint and varnish will firmly adhere.

5. Process for protecting of magnesium objects which comprises cleaning the surface of the object and subjecting it to the action of a substance containing free phenol.

6. In a process for the protection of magnesium and magnesium alloys, the step of reacting upon the cleaned surface of the metal with commercial phenol.

In testimony whereof I have signed my name to this specification.

GILBERT MICHEL.